(12) United States Patent
Iannone et al.

(10) Patent No.: US 9,014,561 B2
(45) Date of Patent: Apr. 21, 2015

(54) WAVELENGTH UPGRADE FOR PASSIVE OPTICAL NETWORKS

(75) Inventors: Patrick P. Iannone, Red Bank, NJ (US);
Mark D. Feuer, Colts Neck, NJ (US);
Kenneth C. Reichmann, Hamilton, NJ (US); Kent G. McCammon, Livermore, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1510 days.

(21) Appl. No.: 11/701,265

(22) Filed: Feb. 1, 2007

(65) Prior Publication Data
US 2007/0212072 A1 Sep. 13, 2007

Related U.S. Application Data

(60) Provisional application No. 60/765,055, filed on Feb. 3, 2006.

(51) Int. Cl.
*H04J 14/00* (2006.01)
*H04J 14/02* (2006.01)
*H04B 10/00* (2013.01)

(52) U.S. Cl.
CPC ......... *H04J 14/0226* (2013.01); *H04J 14/0227* (2013.01); *H04J 14/0282* (2013.01); *H04J 14/0232* (2013.01); *H04J 14/0246* (2013.01); *H04J 14/0247* (2013.01); *H04J 14/025* (2013.01); *H04J 14/0252* (2013.01)

(58) Field of Classification Search
USPC ......... 398/72, 66, 67, 68, 70, 71, 98, 99, 100, 398/101; 33/72
See application file for complete search history.

(56) References Cited

U.S. PATENT DOCUMENTS

| 7,773,838 B2 * | 8/2010 | Lee et al. ............... 385/24 |
| 2004/0213286 A1 * | 10/2004 | Jette et al. ............... 370/466 |
| 2007/0030937 A1 * | 2/2007 | Yajima et al. ............ 375/373 |

OTHER PUBLICATIONS

Hilbk et al., "High Capacity Upgrade of a PON by Means of Wavelength-Routers and WDM Techniques", 1997, The Institution of Electrical Engineers, 3/1-3/5.*

* cited by examiner

*Primary Examiner* — Daniel Dobson
(74) *Attorney, Agent, or Firm* — Wolff & Samson PC (57) ABSTRACT

A method and system for upgrading service to an optical network terminal among a plurality of optical network terminals on a passive optical network. The upgrade enables bidirectional communications between a central office and the optical network terminal over dedicated downstream and upstream wavelength channels outside the downstream and upstream wavelength bands associated with the passive optical network. The optical network terminal to receive upgraded service is disconnected from a passive optical splitter at a remote node serving the optical network terminal, and optically coupled to a port of the multi-port arrayed waveguide grating at the remote node. Wavelength taps are provided at the central office and the remote node to facilitate multiplexing and demultiplexing the dedicated downstream and upstream channels with the downstream and upstream wavelength bands associated with the passive optical network. In this manner, certain users on the passive optical network may receive service upgrades to wavelength specific services without affecting other users who remain on the passive optical network.

11 Claims, 8 Drawing Sheets

WAVELENGTH UPGRADE FOR PASSIVE OPTICAL NETWORKS

This non-provisional application claims the benefit of U.S. Provisional Appl. Ser. No. 60/765,055, entitled "A WAVELENGTH UPGRADE FOR PASSIVE OPTICAL NETWORKS," filed on Feb. 3, 2006.

BACKGROUND OF THE INVENTION

The present invention relates generally to optical networking, and more particularly, to passive optical networks (PONs) and a method and system for upgrading a conventional PON to a higher performance wavelength-division multiplexed passive optical network (WDM PON) subsequent to the original installation of the conventional PON without disrupting service on the conventional PON.

The development of optical fiber communication technologies has enabled exponential growth in the capacity of backbone networks. PONs have been proposed as a flexible broadband infrastructure for delivering voice, video and data to homes and businesses. The most basic PON architecture consists of an optical transceiver at a central office (CO), connected via an optical fiber to a branching point containing a passive optical splitter located in the vicinity (neighborhood) of the customer, and then connected via multiple distribution fibers to transceivers at or near the homes being served. The PON architecture eliminates the requirement for optical-to-electrical-to-optical (OEO) conversion at each node of the fiber optic network by employing passive optical components such as beam splitters and filters at network nodes instead of active optical components. A PON, therefore, is cost effective when compared to active fiber optic networks, and has significant potential for such "fiber-to-the-home" applications. Although this approach has been proposed and demonstrated in the laboratory for approximately twenty years, the widespread deployment of PONs has only recently begun in the United States.

Over the past several years, the developments of several PON standards have helped pave the way for mass deployments of this technology. The two most important standards processes for PONs are being conducted through the IEEE and ITU-T, respectively. The IEEE effort is focused in the IEEE 803.3ah Ethernet in the First Mile Task Force, which is defining standards for Ethernet PONs (EPON). The ITU-T effort is fed by the Full Service Access Networks (FSAN) organization. This group of service providers and vendors has been responsible for the standardization of ATM PON (APON), Broadband PON (BPON), and Gigabit PON (GPON).

Although these PONs differ in capacity, upstream bandwidth allocation, data encapsulation technology, etc., their underlying passive outside plant (also known as optical distribution network) architectures are very similar.

Figure 1:
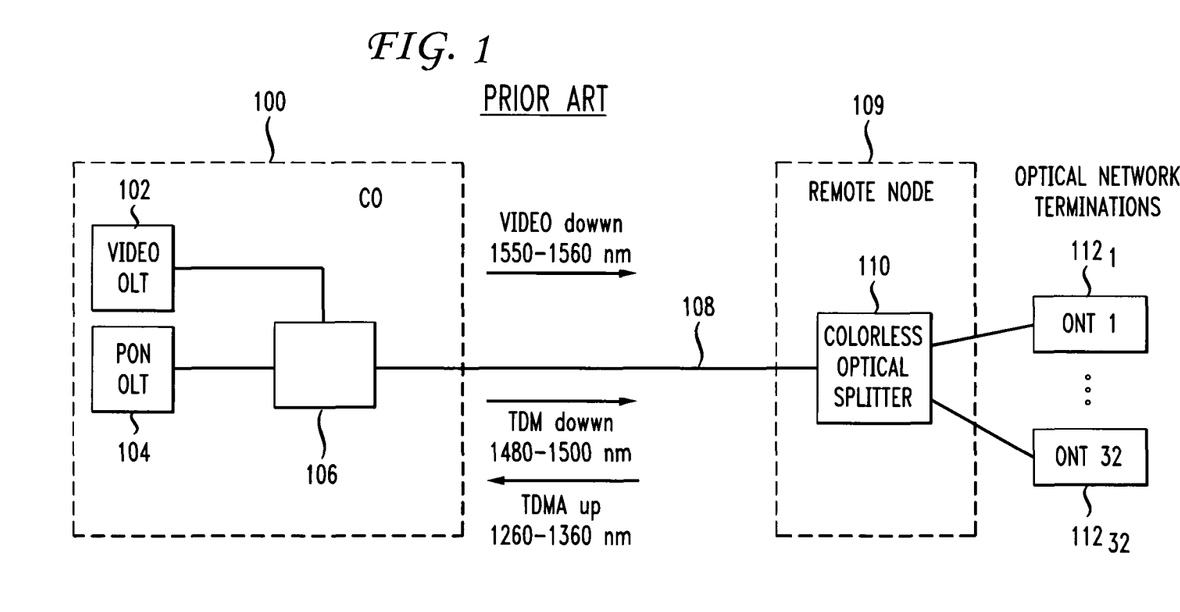
FIG. 1 is a schematic diagram of an exemplary prior art GPON architecture where broadcast video is carried in an enhancement band.

One feature that has been added to the later generations of ITU-T PON standards (BPON and GPON) has been the ability to broadcast video signals over a separate wavelength band. FIG. 1 is a schematic representation of a GPON including the so-called enhancement band for delivering broadcast video services. As indicated in the FIG. 1, the architecture of a representative GPON includes a CO 100 that comprises a video optical line terminal (OLT) 102 and a data OLT 104 that communicate with a core network. The signals from OLT 102 and OLT 104 are multiplexed at 106. Downstream time-division multiplexed (TDM) data is carried in the optical band from 1480-1500 nm wavelength, upstream time-division multiple access (TDMA) data is carried in the optical band from 1260-1360 nm wavelength, and video is carried in the video enhancement band from 1550-1560 nm wavelength. The EPON bandwidth allocation standard in 802.3ah uses the same 1480-1500 nm wavelength band for downstream communication, while upstream TDMA data is carried in the optical band from 1260-1360 nm wavelength. Techniques to add capacity with additional wavelengths apply to BPON, GPON and EPON. The downstream data is communicated over an optical distribution fiber 108 to a remote node containing an optical power splitter 110 that communicates with a plurality of optical network terminals (in the example shown, ONT1-ONT32) designated by the reference numerals $112_1$-$112_{32}$. The wavelength allocation is per ITU-T G.983.3 and for such a GPON with broadcast video in the enhancement band, each ONT 112 contains a triplexer for segregating the three wavelength bands.

Figure 2:
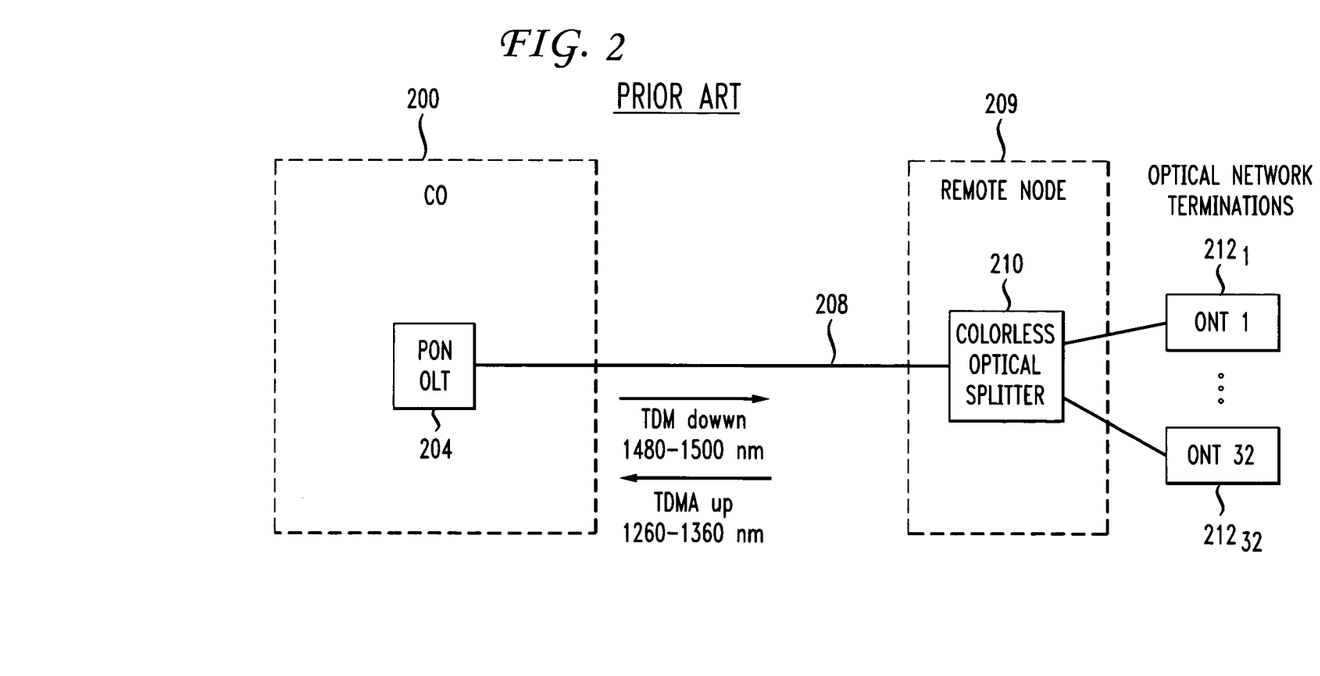
FIG. 2 is a schematic diagram of an exemplary prior art GPON architecture where broadcast video data is included in downstream TDM data.

FIG. 2 is schematic of a GPON system where the video data is included in the downstream TDM data, thereby obviating the need for a G.983.3 enhancement band. Here, the central office 200 includes a data OLT 204 (no video OLT), that communicates via an optical distribution fiber 208 to a passive optical splitter 210 in a manner similar to that described with respect to FIG. 1. A plurality of optical network terminals (ONT1-ONT32) designated by the reference numerals $212_1$-$212_{32}$ are likewise coupled to splitter 210 at the remote node. Considering the large downstream TDM capacity of BPON and GPON (up to 1.2 Gb/s and 2.4 Gb/s, respectively, shared among 32 users), it is possible to distribute video signals using IP packets (IPTV) over the TDM channel. In this expedient, the 1550-1560 nm enhancement band depicted in FIG. 1 is not used.

In view of the expanding use of dedicated "wavelength services," it would be desirable to provide a way for a service provider to upgrade such fiber distribution networks in a cost effective manner without disrupting service to existing PON users.

SUMMARY OF THE INVENTION

In accordance with an aspect of the present invention, a method is provided for upgrading service to an optical network terminal (i.e., user) among a plurality of optical network terminals on a passive optical network. The passive optical network includes a central office comprising a wavelength tap, and a remote node comprising a passive optical splitter which connects each optical network terminal to the passive optical network, a wavelength tap and a multi-port wavelength routing device. The passive optical network enables bidirectional point-to-multipoint communications between the central office and the plurality of optical network terminals over downstream and upstream wavelength bands associated with the passive optical network. The service upgrade enables bidirectional communications between the central office and the optical network terminal to be made over dedicated downstream and upstream wavelength channels that are outside the downstream and upstream wavelength bands associated with the passive optical network. In accordance with the inventive method, the optical network terminal to receive upgraded service is disconnected from the passive optical splitter at the remote node and optically coupled to a port of the multi-port wavelength routing device. A dedicated high-speed connection can thereafter be established between the central office and the upgraded optical network terminal through the steps of: at the central office, multiplexing at least one dedicated downstream wavelength channel associated with the optical network terminal with the downstream wavelength bands associated with the passive optical network, and demultiplexing at least one dedicated upstream wavelength channel associated with the optical network terminal from the upstream wavelength bands associated with the passive optical network; and, at the remote node, demultiplexing the at least one dedicated downstream wavelength channel associated with the optical network terminal from the downstream wavelength bands associated with the passive optical network, and multiplexing the at least one dedicated upstream wavelength channel associated with the optical network terminal with the upstream wavelength bands associated with the passive optical network.

In accordance with another aspect of the invention, a system is provided for upgrading a passive optical network by providing wavelength specific services to an optical network terminal among a plurality of optical network terminals on the passive optical network. A central office includes an optical line terminal that communicates with the plurality of optical network terminals on the passive optical network over downstream and upstream wavelength bands associated with the passive optical network; and a first wavelength tap for multiplexing at least one dedicated downstream wavelength channel associated with the optical network terminal with the downstream wavelength bands associated with the passive optical network, and demultiplexing at least one dedicated upstream wavelength channel associated with the optical network terminal from the upstream wavelength bands associated with the passive optical network. A remote node includes a passive optical splitter and a second wavelength tap for demultiplexing the at least one dedicated downstream wavelength channel associated with the optical network terminal from the downstream wavelength bands associated with the passive optical network, and multiplexing the at least one dedicated upstream wavelength channel associated with the optical network terminal with the upstream wavelength bands associated with the passive optical network. This expedient enables the optical network terminal to be upgraded to wavelength specific services without disrupting service to the remaining optical network terminals among the plurality of optical network terminals on the passive optical network.

In accordance a further aspect of the invention, each of the first and second wavelength taps comprising at least 3 ports. A first port of each wavelength tap is coupled to an optical fiber connecting the central office to the remote node, the second port of each wavelength tap multiplexes and demultiplexes the upstream and downstream wavelength bands associated with the passive optical network, and the third port of each wavelength tap enables the service upgrade by multiplexing and demultiplexing the dedicated upstream and downstream wavelength channels with the upstream and downstream wavelength bands associated with the passive optical network.

In accordance with yet another aspect of the invention, a cyclic multi-port arrayed waveguide grating is provided as an exemplary wavelength routing device at the remote node, the arrayed waveguide grating having one port thereof coupled to a port of the wavelength tap at the remote node, and another port thereof coupled to the optical network terminal receiving upgraded service among the plurality of optical terminals on the passive optical network, the arrayed waveguide grating for directing the dedicated downstream and upstream channels to and from the optical network terminal receiving the upgraded service.

The method and system in accordance with the invention provides a way of inexpensively and selectively upgrading certain users on existing PONs to WDM PONs (or any other future optical access system), without disrupting services to those users on the existing PON, while allowing for such other users to be upgraded in the future. These and other advantages of the invention will be apparent to those of ordinary skill in the art by reference to the following detailed description and the accompanying drawings.

DETAILED DESCRIPTION OF THE PREFERRED EMBODIMENT

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

Figure 3:
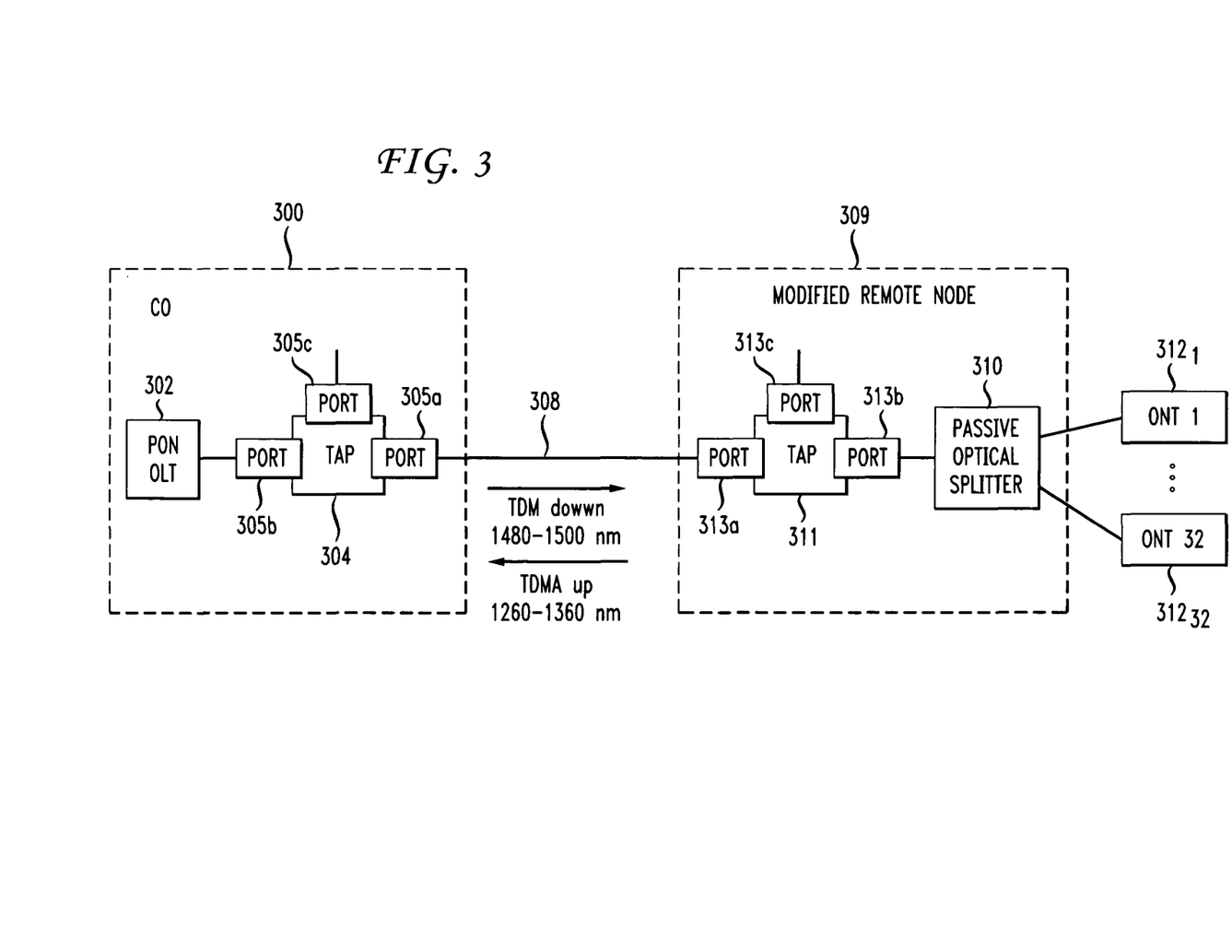
FIG. 3 is a schematic diagram of an exemplary GPON architecture in accordance with an aspect of the invention, where wavelength taps are incorporated at the CO and remote node to facilitate adding and dropping wavelength channels that are outside the standard downstream TDM band (1480-1500 nm) and upstream TDMA band (1260-1360 nm) employed in the GPON.

FIG. 3 is a schematic of a GPON with an upgradeable remote node configuration in accordance with an aspect of the invention, prior to upgrading a particular customer. A CO 300 includes a passive optical network data OLT (PON OLT) 302 that is coupled to a core network (not shown). The CO 300 is modified by including a wavelength-dependent tap ("wavelength tap") 304 between the PON OLT 302 and an optical distribution fiber 308 that connects the CO 300 to a remote node 309. The wavelength tap 304 may also be referred to as a wavelength multiplexer/demultiplexer. Wavelength tap 304 includes a first port 305a (all wavelengths present), second port 305b (the legacy PON port that multiplexes and/or demultiplexes the standard PON wavelengths) and third port 305c (the upgrade port which multiplexes and/or demultiplexes wavelengths other than those utilized by the standard PON). The remote node 309 includes a passive optical splitter 310 and is modified in accordance with an aspect of the invention, to incorporate a wavelength tap 311 on the CO-side of the passive splitter 310. Wavelength tap 311, similar to wavelength tap 304 at the CO 300, includes a first port 313a (all wavelengths present), second port 313b (the legacy PON port that multiplexes and/or demultiplexes the standard PON wavelengths) and third port 313c (the upgrade port which multiplexes and/or demultiplexes wavelengths other than those utilized by the standard PON). Here, the passive optical splitter 310 is coupled to 32 ONTs depicted as 312$_1$-312$_{32}$ in accordance with the standard PON architecture. The taps 304, 311 are designed to multiplex and demultiplex wavelengths other than those in the standard downstream/upstream data bands [downstream TDM band (1480-1500 nm) and upstream TDMA band (1260-1360 nm)], thus bypassing the PON OLT 302 and the passive splitter 310 at the remote node 309. By including this modification to a BPON, GPON or EPON remote node 309, the standard BPON, GPON or EPON wavelengths are generally unaffected. There is a possibility of experiencing a small (approximately 1 dB or less) excess loss as the standard PON wavelength bands traverse the wavelength taps 304, 311. Thus, such a modified remote node 309 can be incorporated into an initial PON installation with only a small penalty in power margin.

Figure 4A:
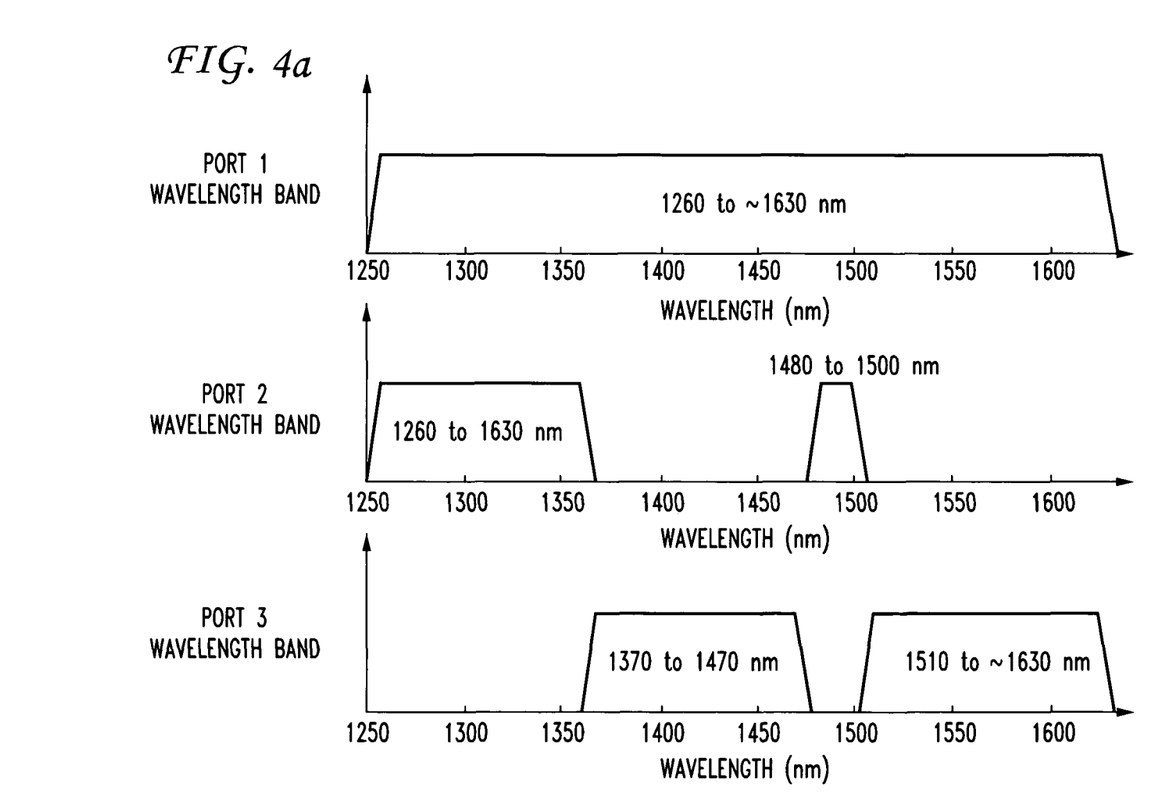
FIG. 4a is a graphical representation of a 3-port wavelength tap in accordance with an aspect of the invention
Figure 4B:
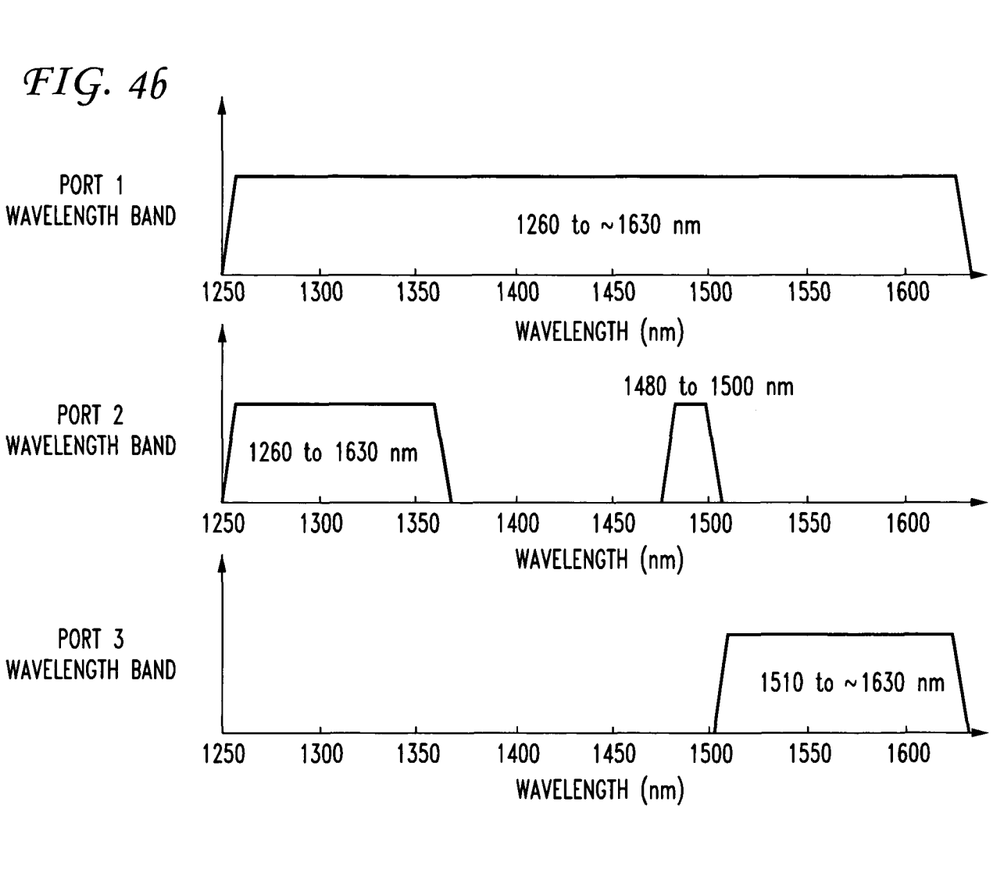
FIG. 4b is a graphical representation of an alternative 3-port wavelength tap in accordance with an aspect of the invention.

FIGS. 4a and 4b are graphical representations of the wavelength bands associated with each port of the exemplary wavelength taps 304, 311 shown in FIG. 3. In both cases, the standard PON upstream and downstream wavelength bands are passed through the tap to the PON splitter 310 at port 2. With reference to wavelength taps 304 and 311, FIG. 4a illustrates how port 3 directs two wavelength bands into (or out of) the PON feeder fiber between the PON OLT 302 and the remote node 309. In the example shown, a wavelength band between 1370 and 1470 nm and a wavelength band above 1510 nm are added and dropped at wavelength taps 304 and 311. Note, port 2 passes the standard PON upstream and downstream wavelengths and port 1 passes all wavelength bands including the standard upstream and downstream wavelengths in combination with the upgraded service. FIG. 4b depicts a wavelength tap where port 3 is configured for only directing wavelength bands above 1510 nm. Accordingly, the expedient shown in FIG. 4a is slightly more complex as it is capable of preserving more wavelengths for future upgrades. It will be appreciated by those skilled in the art that many implementations can be utilized for the wavelength taps without deviating from the scope of the invention. For example, wider or narrower guard bands can be specified between wavelength bands. The guard bands are wavelength ranges over which the filter response is neither a maximum nor minimum, such as from 1500 to 1510 nm in the example shown and described. Filters with narrower guard bands are typically more costly to deploy as opposed to those with wider guard bands, however, the latter would have a smaller wavelength range available for upgrades. It will be further appreciated that the above modification to the remote node is simpler in the case of a system as shown in FIG. 2 as opposed to the GPON with video overlay depicted in FIG. 1. In order to upgrade a system such as that shown in FIG. 1, the additional wavelength tap needs to incorporate a wavelength response that differs from the examples depicted in FIGS. 3 and 4. Specifically, in this case, the standard PON TDM wavelength bands (1260-1360 nm and 1480-1500 nm) and the standardized PON video enhancement band (1550-1560) are multiplexed to and from port 2. The wavelengths multiplexed and demultiplexed at port 3 could be the wavelength bands from 1370-1470 nm, from 1510-1540 nm, and above 1570 nm (also known as the "L-band"). Alternatively, cost saving options could still preserve the 1550-1560 nm video enhancement band by diverting only a subset of the above bands to port 3. A lowest cost option might only direct the L-band (i.e., wavelengths above 1570 nm) to and from port 3.

Figure 5:
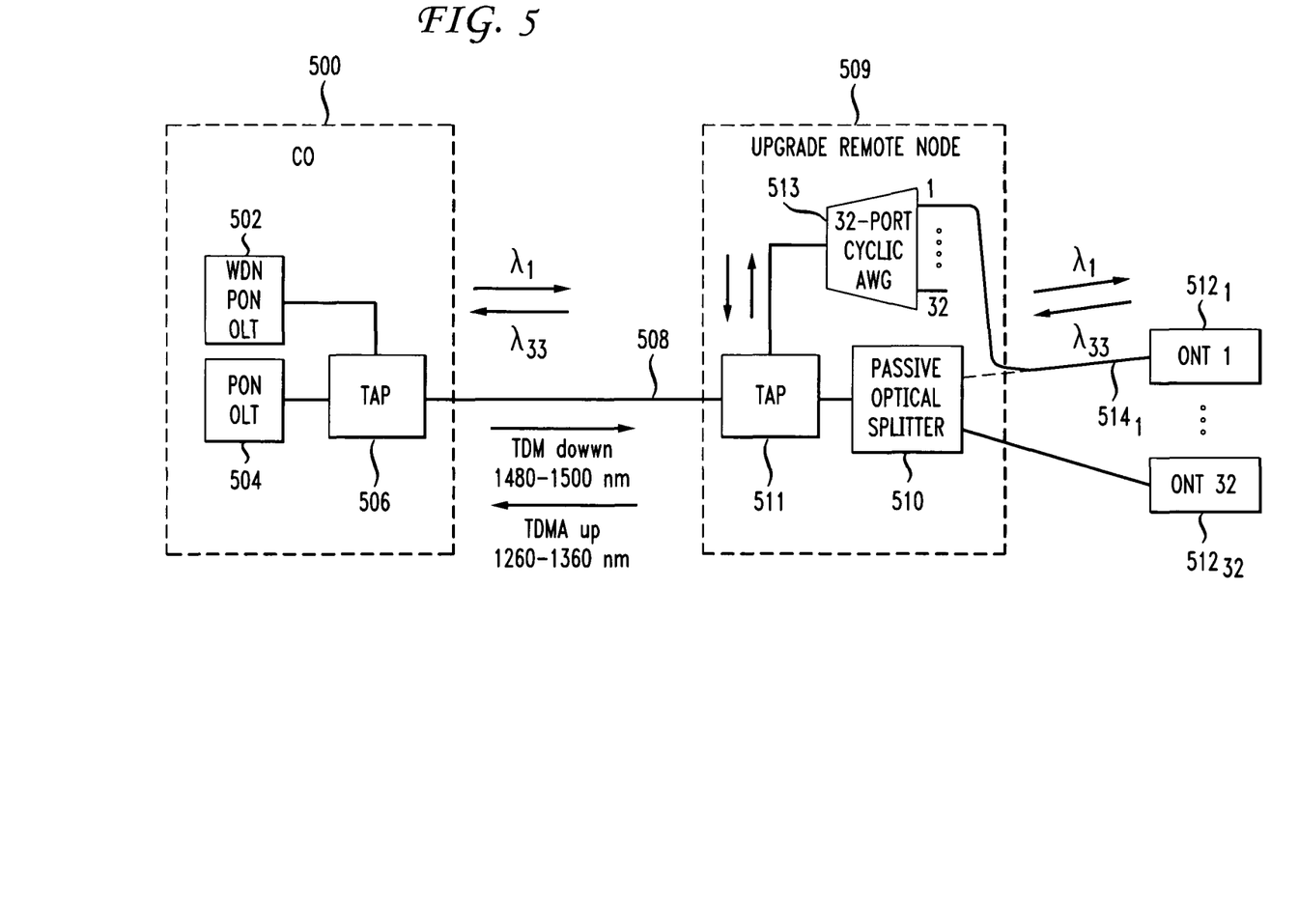
FIG. 5 is a schematic diagram of an exemplary GPON architecture that is upgraded in accordance with an aspect of the present invention, wherein a WDM data OLT is added to the central office and a multiplexer/demultiplexer is employed at the remote node to direct individual wavelengths for upstream and downstream communication with one of the ONTs (i.e., users)

FIG. 5 is a schematic of a service upgrade to a specific customer using the architecture shown in FIG. 3 and described above. In this expedient, the CO 500 is upgraded to include a WDM PON OLT 502 that adds wavelengths to the standard downstream TDM band (1480-1500 nm) and upstream TDMA band (1260-1360 nm) that are communicating between the CO 500 and remote node 509 over optical distribution fiber 508. In the example shown, the first user identified by ONT 1 (512$_1$) is to be upgraded to the WDM PON OLT 502 in response to a demand for higher bandwidth. For example, the first user may require a dedicated high-speed connection, such as a GbE, Fiber Channel, OC-3 (155 Mb/s) OC-12 (622 Mb/s) or OC-48 (2.488 Gb/s). The remaining 31 users (ONT1-ONT 32) are not upgraded at this time. In this regard, ONT 1 will be connected to the CO 500 via wavelengths $\lambda_1$ (downstream) and $\lambda_{33}$ (upstream) to establish a high-speed secure connection thereby removing that user from a previous connection to the PON OLT 504, where all communications were via the standard downstream TDM band and upstream TDMA band. In the example shown, ONT 1 (512$_1$) was originally connected to the PON at the passive optical splitter 510 via optical distribution fiber 514$_1$. The "dashed" portion of optical distribution fiber 514$_1$ depicts the original connection to the passive optical splitter 510. The upgrade is implemented through wavelengths $\lambda_1$ (downstream) and $\lambda_{33}$ (upstream) that are coupled to the optical distribution fiber 508 at the CO 500 via wavelength tap 506. Similarly, these wavelengths are now coupled to ONT 1 (512$_1$) after the upgrade via wavelength tap 511 and a 32-port cyclic AWG 513 (note, the number of ports of the AWG 513 is selected based on the number of users served). In this application, the AWG 513 is connected on one side to the wavelength tap 511, and port 1 of the AWG 513 is then connected to the optical distribution fiber 514$_1$ that previously connected ONT 1 (512$_1$) to the passive optical splitter 510 when the first user was originally on the PON. In this regard, it is necessary to upgrade the ONT 1 (512$_1$) for point-to-point wavelength specific operation through the use of an optical diplexer. Similarly, each WDM PON OLT 502 is provided with an identical diplexer. Such optical diplexers are well known in the art. Using this methodology, the remaining 31 users, ONT 2-ONT 32 (512$_2$-512$_{32}$) on the PON may be migrated to the WDM PON as demand and/or deployment strategy requires. In this case, the WDM PON OLT 502 can incorporate a multiplexer/demultiplexer capable of handling all 64 wavelengths of a fully populated 32-user WDM PON (i.e., a 64-port DWDM multiplexer/demultiplexer subsystem), or the WDM PON OLT 502 may be upgraded to support multiple WDM users at a later date. It will be appreciated by those skilled in the art that other types of multi-port wavelength routing devices in lieu of the AWG 513 that is shown and described herein may be utilized within the scope of the invention. Specifically, such devices might include free-space grating routers or planar lightwave circuits based on ring resonators.

Figure 6:
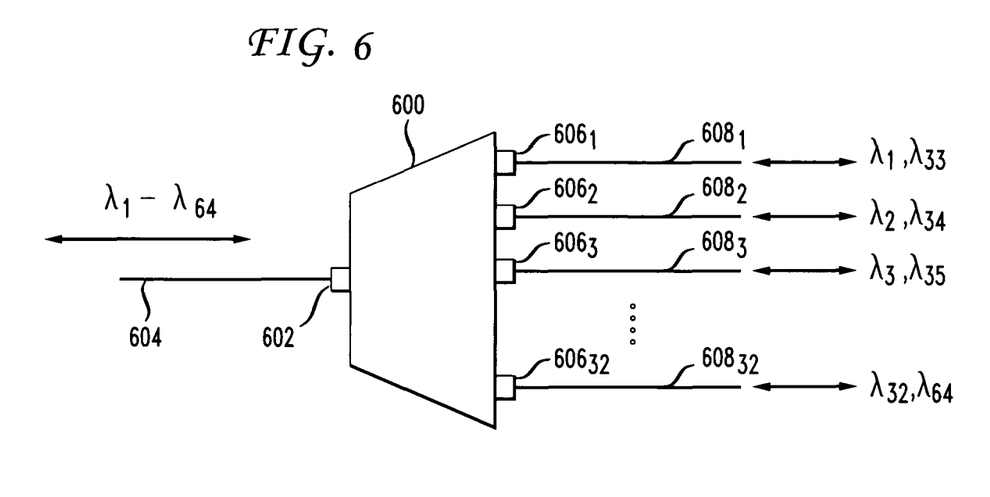
FIG. 6 is a schematic diagram of an exemplary wavelength routing device in the form of a cyclic arrayed waveguide grating (AWG) used as a multiplexer/demultiplexer at the remote node for adding dedicated wavelength services to existing PON users.

FIG. 6 is a schematic of an illustrative 32-port cyclic AWG 600 that serves as an exemplary multi-port wavelength routing device for upgrading 32 individual customers using the GPON architecture depicted in FIG. 5. As will be appreciated by those skilled in the art, the AWG 600 has a single port 602 for connecting to the wavelength tap via an optical fiber 604 in the remote node of the GPON, and a plurality of ports $606_1$, $606_2$, $606_3$, ... $606_{32}$ that couple via respective optical fibers $608_1$, $608_2$, $608_3$, ... $608_{32}$ to the individual ONTs. The "cyclic property" of the AWG 600 enables multiple wavelengths to be input and output from each of ports $606_1$, $606_2$, $606_3$, ... $606_{32}$, with the wavelength spacing defined by the free-spectral range (FSR) of the AWG 600. Thus, the AWG 600 operates to demultiplex downstream wavelengths ($\lambda_1$-$\lambda_{32}$) from the CO to the ONTs, and multiplex upstream wavelengths ($\lambda_{33}$-$\lambda_{64}$) from the ONTs to the CO, such that bidirectional single fiber links are established over the GPON with distinct up/down wavelengths. In such an exemplary implementation, the 32-port AWG 600 with a 50 GHz channel spacing (0.4 nm wavelength spacing) has a FSR of 12.8 nm, such that the entire 64 channel band, covering 2 FSRs, spans 25.6 nm. This implementation fits within a conventional C-band. Preferably, the AWG 600 is athermal to avoid misalignment with wavelength channels attributable to temperature fluctuations. It will be appreciated by those skilled in the art that the AWG port count, FSR and channel spacing can be modified depending on the details of the deployment without deviating from the scope of the invention. For example, a 100 GHz channel spacing with an approximate 52 nm channel band could also be used.

Figure 7:
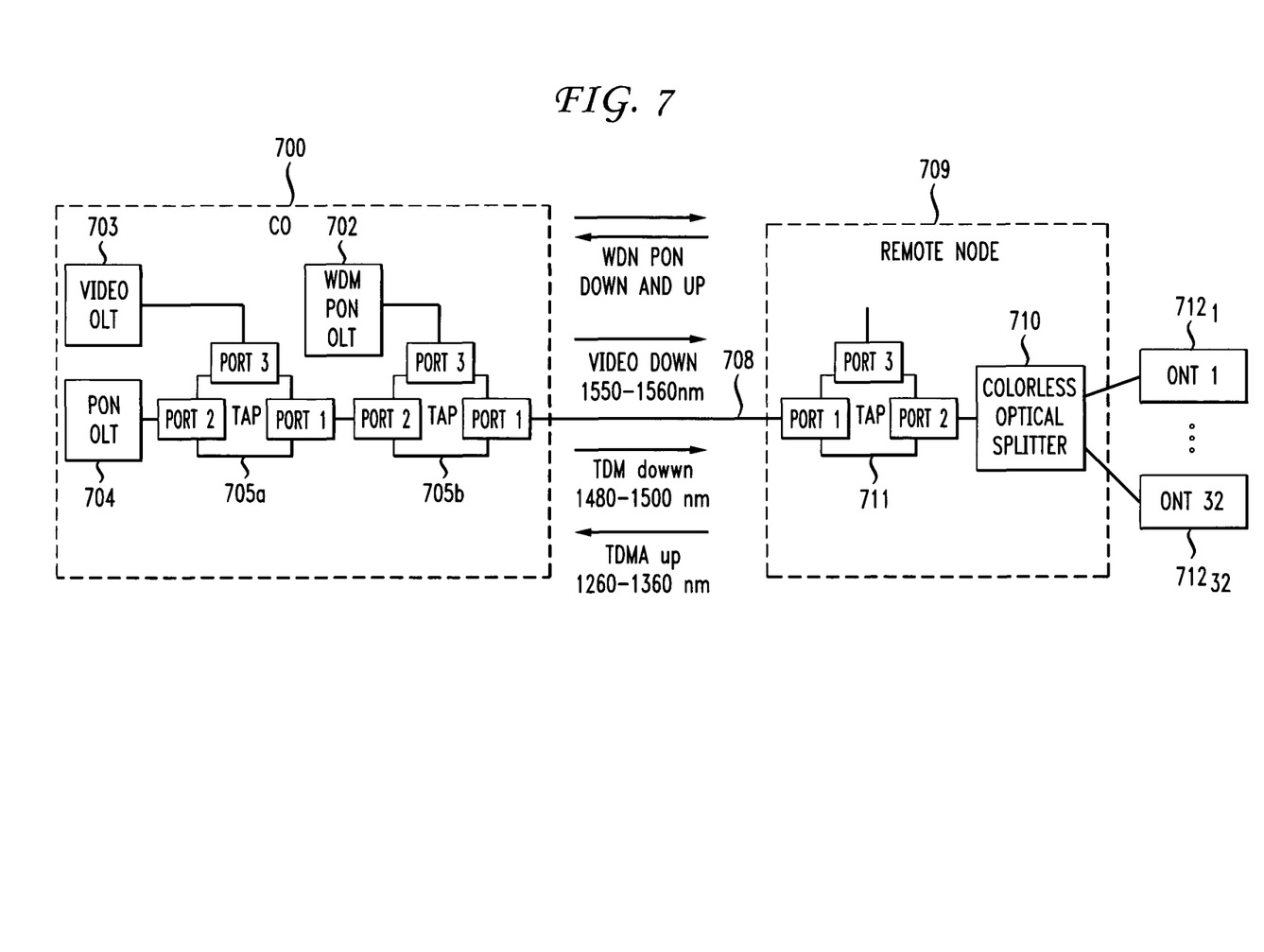
FIG. 7 is a schematic of an exemplary GPON architecture that utilizes one wavelength tap at the CO to multiplex signals from a Video OLT and a PON OLT, and an additional wavelength tap to multiplex signals from a WDM data OLT that is added at the CO to upgrade existing users on the PON in accordance with an aspect of the invention

FIG. 7 is a a schematic of a modification to the GPON architecture depicted in FIG. 1 for effectuating service upgrades using the principles described above with respect to FIGS. 3-6. In this expedient, the CO 700 includes a video OLT 703 and PON OLT 704. Communications between the video OLT 703 and PON OLT 704 are coupled at a first 3-port wavelength tap 705a. In this expedient, the CO 700 is upgraded to include a WDM PON OLT 702 that adds dedicated user wavelengths to the standard downstream TDM band (1480-1500 nm), downstream video band (1550-1560 nm) and upstream TDMA band (1260-1360 nm) that are initially communicating between the CO 700 and remote node 709 over the PON. In the exemplary embodiment, port 2 of a second 3-port wavelength tap 705b is coupled to port 1 of the first wavelength tap 705a, and port 1 of the second wavelength tap 705b is coupled to an optical distribution fiber 708 between the CO 700 and remote node 709. Port 3 of the second wavelength tap 705b is coupled to the WDM PON OLT 702. The remaining architecture at remote node 709 is similar to that shown in FIGS. 3 and 5, using a standard passive optical splitter 710 and adding a wavelength tap 711 to provide for upgrading the users on the PON as required. As in the prior example shown in FIG. 3, 32 users (ONT1-ONT 32) depicted as $712_1$-$712_{32}$ are shown as being connected to the PON prior to any individual upgrade. Port 3 of wavelength tap 711 is connected to a multiport wavelength routing device (not shown) to facilitate the upgrade as described above with respect to FIGS. 3-5. It will be appreciated by those skilled in the art, that while two 3-port wavelength taps 705a and 705b are shown at the CO 700 in this example, a single 4-port wavelength tap could be employed in lieu thereof to couple the WDM PON OLT 702, Video OLT 703 and PON OLT 704 to the optical distribution fiber 708.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method of providing upgraded services to an optical network terminal among a plurality of optical network terminals on a passive optical network, comprising:

upgrading a central office to include a first wavelength tap and a second wavelength tap, wherein:

the first wavelength tap comprises:

a first port to couple the first wavelength tap and the second wavelength tap and to support a plurality of optical wavelengths, a second port to multiplex and demultiplex wavelength bands associated with the passive optical network, and a third port to couple the passive optical network and a video optical line terminal and to multiplex and demultiplex wavelengths different from the wavelength bands associated with the passive optical network; and the second wavelength tap comprises:

a fourth port to couple, via an optical distribution fiber, the central office and a remote node, a fifth port to couple the first wavelength tap and the second wavelength tap and to multiplex and demultiplex wavelengths different from the wavelength bands associated with the passive optical network, and a sixth port to multiplex and demultiplex wavelengths different from the wavelength bands associated with the passive optical network;

multiplexing and demultiplexing, by the first port, the second port, the fourth port, and the fifth port, wavelength bands associated with the passive optical network; and multiplexing and demultiplexing, by the sixth port, wavelengths different from the wavelength bands associated with the passive optical network.

2. The method of claim 1, wherein the multiplexing and demultiplexing, by the sixth port, wavelengths different from the wavelength bands associated with the passive optical network further comprises:

multiplexing a dedicated downstream channel associated with an optical network terminal.

3. The method of claim 2, further comprising:

providing upgraded services to the optical network terminal via the dedicated downstream channel associated with the optical network terminal.

4. The method of claim 2, wherein the multiplexing and demultiplexing, by the sixth port, wavelengths different from the wavelength bands associated with the passive optical network further comprises:

demultiplexing a dedicated upstream channel associated with the optical network terminal.

5. The method of claim 4, further comprising:
upgrading a remote node associated with the optical network terminal to include a third wavelength tap that comprises a seventh port to support a second plurality of optical wavelengths, a eighth port to multiplex and demultiplex wavelength bands associated with the passive optical network, and a ninth port to multiplex and demultiplex wavelengths different from the wavelength bands associated with the passive optical network;
multiplexing and demultiplexing, by the eighth port, wavelength bands associated with the passive optical network; and
multiplexing and demultiplexing, by the ninth port, wavelengths different from the wavelength bands associated with the passive optical network.

6. The method of claim 5, wherein a wavelength division multiplexer-demultiplexer optical line terminal is coupled to the sixth port at the central office.

7. The method of claim 6, wherein the remote node includes a passive optical splitter coupled to the third wavelength tap via the eighth port.

8. A system for providing upgraded service to an optical network terminal among a plurality of optical network terminals on a passive optical network, comprising:
a passive optical network data optical line terminal located at a central office;
a video optical line terminal;
a wavelength division multiplexer-demultiplexer optical line terminal;
a first wavelength tap; and
a second wavelength tap, wherein:
the first wavelength tap communicatively connects the video optical line terminal to the passive optical network data optical line terminal and comprises:
a first port to couple the first wavelength tap and the second wavelength tap and to support a plurality of optical wavelengths;
a second port to multiplex and demultiplex wavelength bands associated with the passive optical network; and
a third port to couple the passive optical network data optical line terminal and the video optical line terminal and to multiplex and demultiplex wavelengths different from the wavelength bands associated with the passive optical network; and
wherein:
the second wavelength tap comprising:
a fourth port to couple, via an optical distribution fiber, the central office and a remote node;
a fifth port to couple the first wavelength tap and the second wavelength tap and to multiplex and demultiplex wavelength bands associated with the passive optical network; and
a sixth port to couple the wavelength division multiplexer-demultiplexer optical line terminal and the second wavelength tap and to multiplex and demultiplex wavelengths different from the wavelength bands associated with the passive optical network.

9. The system of claim 8, wherein the sixth port is further configured to:
multiplex a dedicated downstream channel associated with an optical network terminal.

10. The system of claim 9, wherein the dedicated downstream channel associated with the optical network terminal supports upgraded services.

11. The system of claim 10, wherein the sixth port is further configured to:
demultiplex a dedicated upstream channel associated with the optical network terminal.

* * * * *